United States Patent [19]

Scott

[11] Patent Number: 5,351,562
[45] Date of Patent: Oct. 4, 1994

[54] HYDRAULIC--PNEUMATIC CUSHIONING DEVICE WITH PRESSURE INDICATOR

[75] Inventor: Mark P. Scott, Boiling Springs, Pa.

[73] Assignee: Keystone Railway Equipment Co., Inc., Camp Hill, Pa.

[21] Appl. No.: 167,454

[22] Filed: Dec. 15, 1993

Related U.S. Application Data

[63] Continuation of Ser. No. 825,506, Jan. 24, 1992, abandoned.

[51] Int. Cl.$^5$ .................................... G01M 17/04
[52] U.S. Cl. .............................. 73/37; 116/205; 116/272; 73/11.04
[58] Field of Search ....... 116/272, 205, 279, DIG. 28; 73/37, 47, 39, 11

[56] References Cited

U.S. PATENT DOCUMENTS

| | | | |
|---|---|---|---|
| 23,166 | 3/1859 | Gill . | |
| 177,564 | 5/1976 | Rudd . | |
| 1,923,776 | 8/1933 | Crowley | 73/111 |
| 1,949,293 | 2/1934 | Crowley | 73/111 |
| 1,998,420 | 4/1935 | Carliss | 73/111 |
| 2,011,264 | 8/1935 | Wagner | 73/111 |
| 2,126,355 | 8/1938 | Thomas | 116/114 |
| 2,137,495 | 11/1938 | Kershaw | 116/65 |
| 2,341,538 | 2/1944 | Grant | 116/114 |
| 2,368,564 | 1/1945 | Pascoo | 137/69.5 |
| 2,548,750 | 4/1951 | Stroop | 116/114 |
| 2,570,655 | 10/1951 | Druge | 137/53 |
| 2,572,471 | 10/1951 | Gouirand | 251/137 |
| 2,686,445 | 8/1954 | Keck | 81/3 |
| 2,690,360 | 9/1954 | Young | 308/36.1 |
| 2,703,546 | 12/1954 | Allen | 116/114 |
| 2,721,575 | 10/1955 | Gier et al. | 137/493.8 |
| 2,756,989 | 8/1956 | Peras | 267/34 |
| 2,827,122 | 3/1958 | Clark | 169/31 |
| 2,839,265 | 6/1958 | Hobbs | 251/85 |
| 2,948,256 | 8/1960 | Tapp | 116/34 |
| 2,951,985 | 9/1960 | Keehn | 116/114 |
| 3,031,165 | 4/1962 | Allen | 251/111 |
| 3,033,552 | 5/1962 | Ogden | 267/1 |
| 3,035,714 | 5/1962 | Peterson | 213/43 |
| 3,068,703 | 12/1962 | Morton | 73/419 |
| 3,103,952 | 9/1963 | Whiting | 137/557 |
| 3,105,458 | 10/1963 | Downham | 116/114 |
| 3,144,171 | 8/1964 | Gagnan et al. | 222/3 |
| 3,149,752 | 9/1964 | Gagnan et al. | 222/3 |
| 3,186,562 | 6/1965 | Angold | 213/8 |
| 3,200,787 | 8/1965 | Darnell | 116/70 |
| 3,203,246 | 8/1965 | Horwitt et al. | 73/419 |
| 3,204,819 | 9/1965 | Gurtler | 222/5 |
| 3,209,949 | 10/1965 | Gurtler | 222/49 |
| 3,225,784 | 12/1965 | Call | 137/234 |
| 3,229,851 | 1/1966 | Horwitt et al. | 222/49 |
| 3,233,447 | 2/1966 | Horrell | 73/46 |
| 3,247,824 | 4/1966 | Rodgers | 116/70 |
| 3,249,240 | 5/1966 | Empson | 213/43 |
| 3,252,587 | 5/1966 | Scales | 213/43 |
| 3,259,252 | 7/1966 | Peterson | 213/43 |
| 3,286,726 | 11/1966 | Guy | 137/505.18 |
| 3,360,982 | 1/1968 | Mitchell et al. | 73/40 |
| 3,406,834 | 10/1968 | Brunt | 213/8 |
| 3,414,134 | 12/1968 | Nealis | 213/43 |
| 3,448,620 | 6/1969 | Ryan | 73/419 |

(List continued on next page.)

FOREIGN PATENT DOCUMENTS

| | | | |
|---|---|---|---|
| 451021 | 9/1948 | Canada . | |
| 403089 | 12/1920 | Fed. Rep. of Germany . | |
| 175889 | 3/1922 | United Kingdom | 116/272 |

OTHER PUBLICATIONS

Keystone Railway Equipment Company, Inc. Form 100-6-85, 8 pages.

Primary Examiner—Hezron E. Williams
Assistant Examiner—Joseph W. Roskos
Attorney, Agent, or Firm—Thomas Hooker

[57] ABSTRACT

A hydraulic-pneumatic cushioning device including a pressure indicator mounted on the device or remote from the device and connected to the pressure chamber within the cushioning device. The indicator includes a recess and a small pin extending into the recess. The position of the pin relative to the recess provides a tactile indication of the condition of the cushioning device.

56 Claims, 3 Drawing Sheets

U.S. PATENT DOCUMENTS

| | | | |
|---|---|---|---|
| 3,510,117 | 5/1970 | Scholin et al. | 267/1 |
| 3,519,011 | 7/1970 | Pennanen | 136/102 |
| 3,534,661 | 10/1970 | Hettlinger | 92/394 |
| 3,536,095 | 10/1970 | Demeter | 137/557 |
| 3,584,596 | 6/1971 | Westcott | 116/70 |
| 3,587,405 | 6/1971 | Holmes | 92/5 |
| 3,596,500 | 8/1971 | Rees | 73/39 |
| 3,596,521 | 8/1971 | Guy | 73/419 |
| 3,640,241 | 2/1972 | Adaglio | 116/109 |
| 3,651,827 | 3/1972 | Hammer et al. | 137/469 |
| 3,656,659 | 4/1972 | Ishida | 222/49 |
| 3,691,981 | 9/1972 | Rao | 116/70 |
| 3,702,637 | 11/1972 | Bower | 169/31 |
| 3,738,311 | 6/1973 | Appleton | 116/70 |
| 3,776,391 | 12/1973 | Hawthorne | 213/8 |
| 3,854,596 | 12/1974 | Stephenson et al. | 213/8 |
| 3,913,747 | 10/1975 | Crummett | 213/8 |
| 3,917,075 | 11/1975 | Knippel | 213/8 |
| 4,007,894 | 2/1977 | Hartel | 244/104 |
| 4,037,860 | 7/1977 | Thiele | 280/709 |
| 4,198,869 | 4/1980 | Mayernik | 73/709 |
| 4,252,012 | 2/1981 | Koepler et al. | 73/11 |
| 4,257,580 | 3/1981 | Schnitzius | 267/65 |
| 4,278,856 | 7/1981 | Owens | 200/82 |
| 4,304,338 | 12/1981 | Carle et al. | 213/8 |
| 4,334,624 | 6/1982 | Detmold | 213/43 |
| 4,384,591 | 5/1983 | Tan | 137/322 |
| 4,491,160 | 1/1985 | Axthammer et al. | 141/349 |
| 4,619,328 | 10/1986 | Seyler et al. | 116/205 X |
| 4,622,857 | 11/1986 | Nelson | 73/744 |
| 4,662,616 | 5/1987 | Hennells | 267/64 |
| 4,673,063 | 6/1987 | Engle | 116/272 X |
| 4,721,289 | 1/1988 | Hennells | 267/64.28 |
| 4,739,889 | 4/1988 | Bomgardner | 213/43 |
| 4,742,997 | 5/1988 | Wallis | 267/119 |
| 4,777,828 | 10/1988 | Ferris | 73/744 |
| 4,813,655 | 3/1989 | Hennells | 267/64.28 |
| 4,838,527 | 6/1989 | Holley | 267/64 |
| 4,840,195 | 6/1989 | Zabrenski | 137/312 |
| 4,850,388 | 7/1989 | Shepherd | 137/212 |
| 4,862,968 | 9/1989 | Woodman | 116/272 X |
| 4,899,684 | 2/1990 | Houzvic et al. | 116/272 |
| 4,951,697 | 8/1990 | Fritts | 116/272 X |
| 4,986,128 | 1/1991 | Burns | 116/272 X |
| 5,101,754 | 4/1992 | Bartscher et al. | 116/34 |
| 5,103,670 | 4/1992 | Wu et al. | 73/146 |
| 5,119,066 | 6/1992 | Ballyns | 340/442 |
| 5,135,023 | 8/1992 | Ross | 137/505.11 |
| 5,167,155 | 12/1992 | Rodgers | 73/299 |
| 5,168,815 | 12/1992 | Comer et al. | 105/72 |
| 5,172,594 | 12/1992 | Dyke | 73/290 |
| 5,179,856 | 1/1993 | Huang | 73/4 |
| 5,187,337 | 2/1993 | Fuijie et al. | 200/82 |
| 5,210,769 | 5/1993 | Seidel et al. | 73/295 |
| 5,211,698 | 5/1993 | Winfrey | 303/86 |
| 5,226,315 | 7/1993 | Bartscher et al. | 73/48 |
| 5,229,745 | 7/1993 | Koide et al. | 340/451 |
| 5,229,750 | 7/1993 | Welche, Jr. et al. | 340/605 |
| 5,243,158 | 9/1993 | Zimmermann | 200/83 |
| 5,275,951 | 1/1994 | Chow et al. | 436/50 |
| 5,279,156 | 1/1994 | van der Pol | 73/290 |
| 5,279,169 | 1/1994 | Freeman | 73/866 |

HYDRAULIC--PNEUMATIC CUSHIONING DEVICE WITH PRESSURE INDICATOR

This is a continuation of co-pending application Ser. No. 07/825,506, filed Jan. 24, 1992, now abandoned.

FIELD OF THE INVENTION

The invention relates to cushioning or shock absorbing devices of the type having a sealed interior charged with a volume of hydraulic fluid and a pressurized gas used for automatic return of a collapsed device to the normal extended position. These devices may be used to cushion the coupling of railway cars, closing of presses or the movement of suspensions in large off-road vehicles.

DESCRIPTION OF THE PRIOR ART

Conventional hydraulic-pneumatic cushioning devices are charged with hydraulic fluid and pressurized nitrogen gas. These devices are highly reliable and often require little, if any, maintenance. Railway car hydraulic-pneumatic cushioning devices may have a life-span of ten or more years without leaking or loss of internal pressure.

However, occasionally cushioning devices leak hydraulic fluid through the piston rod seal. When this occurs, the leaked hydraulic fluid builds up on the outside of the device and commonly collects dirt on the bottom of the unit and may promote corrosion of the exterior of the unit and surrounding support members. However, a loss of hydraulic fluid is not a positive indication that the performance of the cushioning device is degraded. An appreciable volume of hydraulic fluid may be lost from modern hydraulic-pneumatic cushioning devices before the cushioning capacity of the device is degraded. This means that a visual inspection of the cushioning device to determine whether it is wet or dry does not provide a positive indication of whether or not the cushioning device works and, for example, is capable of absorbing shocks between adjacent railway cars during coupling.

The operation efficiency of a hydraulic-pneumatic cushioning device may be determined by measuring the pressure of the hydraulic fluid in the device. This pressure is proportional to the volume of hydraulic fluid in the device. If hydraulic fluid leaks from the device the volume of the remaining hydraulic fluid is reduced thereby increasing the volume for the pressurized nitrogen within the unit and, consequently, reducing the pressure of the nitrogen. If the measured pressure of the hydraulic fluid is below a threshold level then there is insufficient fluid remaining within the device to cushion shocks properly. In practice, substantial hydraulic fluid may leak from the cushioning device before the cushioning efficiency of the device is degraded. This means that pressure within a leaking the device may fall considerably below the charging pressure without degrading the cushioning efficiency of the device.

It is conventional to test the efficiency of a cushioning unit by determining the pressure of the hydraulic fluid within the unit. This test is performed by removing a cap covering a check valve in the unit, threadably attaching a pressure gauge to the check valve and then determining the pressure by reading the gauge. After the test is performed, the gauge must be unthreaded and the cover cap reattached. This is a time consuming and difficult operation, particularly when performed on a railway car cushioning device located within the frame of the car in a recess accessible only from below the car. In practice, railway inspectors do not readily perform this test and, as a result, tend not to check the actual pressure of the hydraulic fluid in cushioning devices to determine whether the devices are or are not operating properly.

Another conventional way of determining the amount of hydraulic fluid in a hydraulic-pneumatic cushioning device is to provide a standpipe within the pressure chamber in the device and a window for viewing the standpipe from the outside of the cushioning device. This method has two problems. First, the use of a window within the pressure wall of the cushioning device requires reducing the charging pressure in the device to prevent leaks and, accordingly, the efficiency of the cushioning device.

Secondly, the window tends to become obscured during use of the device making a visual determination of the level of the hydraulic fluid in the device difficult at best and sometimes impossible when the device is mounted in an inaccessible location. Hydraulic-pneumatic cushioning devices used for coupling railway cars are mounted in virtually inaccessible locations under the railway cars.

Because of the difficulty of determining the actual amount of hydraulic fluid within a hydraulic-pneumatic cushioning device in a railway car and the severe consequence in terms of freight damage resulting from failure to detect a defective hydraulic-pneumatic cushioning device, the railroads assume all leaking devices do not work. All of these devices are removed for reconditioning. Removal of cushioning devices is a difficult procedure requiring burning or cutting away of bolts and rivets and lowering of the very heavy units down from the railway car. During removal of the devices and shipment to a repair facility it is possible that injury may occur to the devices, particularly to the exposed piston rods. In practice, it has been found that only about 30 percent of hydraulic-pneumatic cushioning devices returned for repair are defective and require repair. The remaining 70 percent of these devices work properly, despite the observed hydraulic fluid leakage. The premature removal, shipment, repair, and reinstallation of properly operating hydraulic-pneumatic cushioning devices is difficult, time consuming, expensive and unnecessary.

SUMMARY OF THE INVENTION

The invention relates to a hydraulic-pneumatic cushioning device with a pressure indicator mounted in the front head of the device where it is readily accessible for tactile inspection by a worker checking the condition of the device, a pressure indicator and a related method. The exposed end of the pressure indicator has a recess and a small pin that extends into the recess from the body of the cushioning indicator. The inspector feels the end of the pressure indicator to sense the position of the pin. If the pin is withdrawn into the recess, the inspector immediately knows that the pressure within the cushioning device is below the threshold level and, as a result, there is an inadequate volume of hydraulic fluid within the device. The device is known to be defective and must be removed and repaired.

If the pin extends outwardly into the recess the inspector pushes on the pin. If the pin cannot be pushed in or is hard to push in and returns to the extended position when released, possibly slowly because of friction, the inspector knows that pressure within the cushioning device is above the threshold pressure and there is sufficient hydraulic fluid within the device for proper cushioning. The device can be left in operation.

However, if the pin is out when first sensed and the inspector can push the pin flush to the bottom of the recess and the pin stays withdrawn in withdrawn position and does not return into the recess or when the pin is found already withdrawn from the recess, the inspector knows that the pressure within the unit is below the threshold level, there is insufficient volume of hydraulic fluid and the device needs to be removed and repaired.

As a matter of precaution, the inspector may conduct a conventional pressure check on the installed cushioning device to confirm the low pressure as determined by the pressure indicator prior to removal of the cushioning device.

The pressure indicator is highly reliable to assure proper operation during the long-term useful life of the cushioning device. Movement of the indicating pin relative to the recess is limited by the frictional loading between a pressure seal and pin, thereby decreasing incidental movement of the pin during operation of the cushioning device. As a practical matter, high friction loading assures that once the cushioning device has been charged with high pressure nitrogen gas, the pressure exerted on the pin by the hydraulic fluid in the unit holds the pin in the extended position within the recess until the pressure should drop below the threshold level sufficiently to allow a spring in the pressure indicator to overcome the pressure and retract the pin against the frictional loading exerted by the seal. The seal is highly reliable and includes a pressure seal which is biased against the pin by the internal pressure of the hydraulic fluid in the cushioning device to prevent leakage. This fluid also lubricates the seal when the pin is shifted.

Other objects and features of the invention will become apparent as the description proceeds, especially when taken in conjunction with the accompanying drawings illustrating the invention, of which there are three sheets and two embodiments.

DESCRIPTION OF THE PREFERRED EMBODIMENTS

Figure 1:
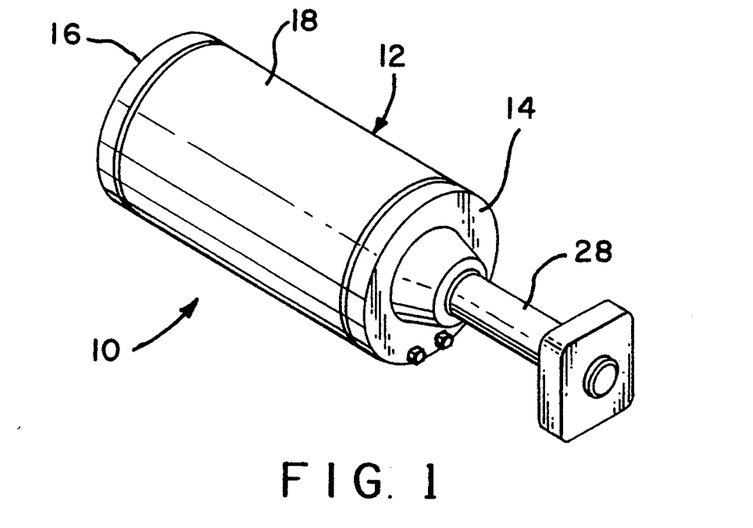
FIG. 1 is a perspective view of a hydraulic-pneumatic cushioning device according to the invention.
Figure 2:
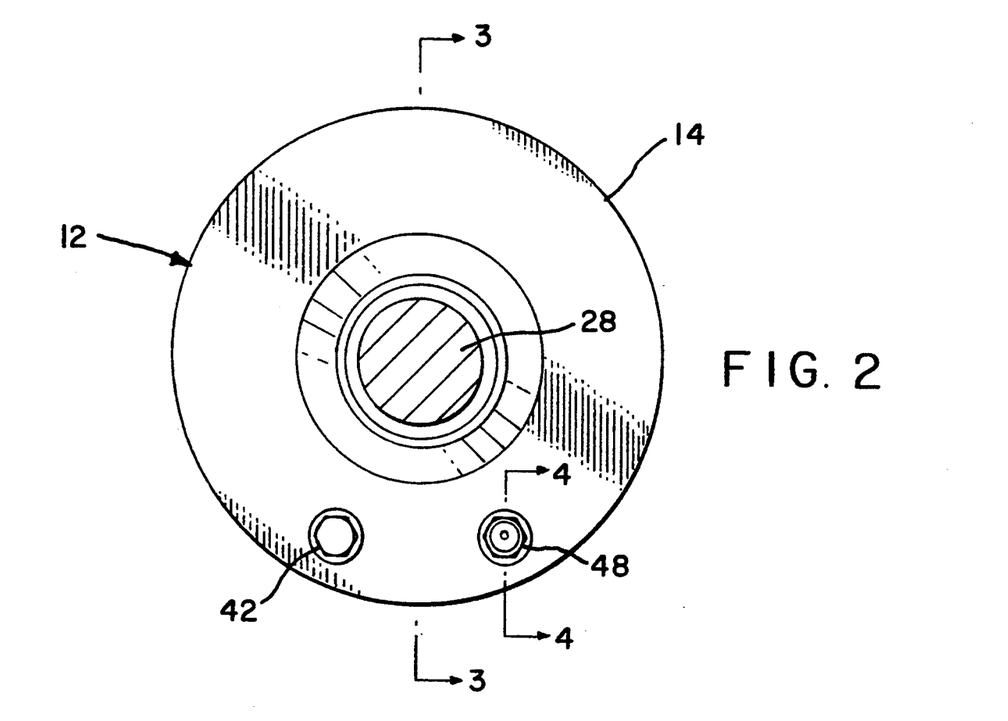
FIG. 2 is a front view of the device, partially broken away.
Figure 3:
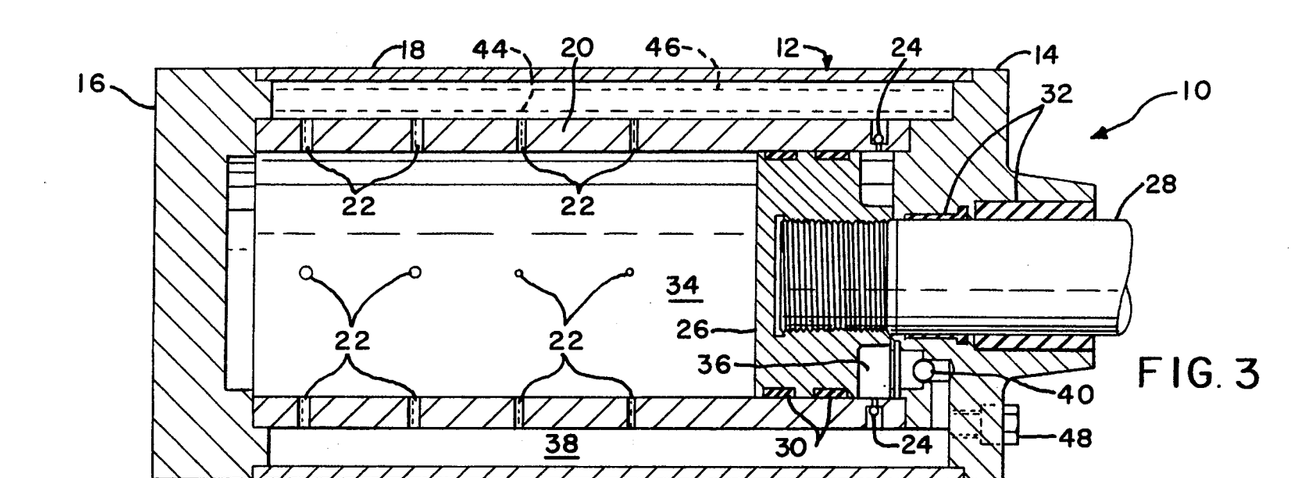
FIGS. 3 and 4 are sectional views taken along lines 3—3 and 4—4, respectively, of FIG. 2.

Hydraulic-pneumatic cushioning device 10 includes a cylindrical body 12 having a front head 14, rear head 16 and tubular wall 18 extending between the two heads. An inner piston cylinder 20 is confined within the body inwardly of wall 18 and extends between and is joined to the two heads as shown in FIG. 3. A series of flow control bores 22 are formed through cylinder 20 adjacent the rear head 16. One way check valves 24 are mounted in the cylinder adjacent front head 14 to permit hydraulic fluid to flow outwardly through the cylinder.

Piston 26 is fitted within inner piston cylinder 20 and is connected to a piston rod 28 extending outwardly through a bore formed in the front head 14. The piston carries suitable seals 30 for forming a tight seal with the inner surface of cylinder 20 and preventing flow of hydraulic fluid past the piston. Rod seals 32 are provided in front head 14 to prevent leakage of hydraulic fluid from the interior of device 10.

The interior of the hydraulic-pneumatic cushioning device 10 includes a fluid reservoir divided into three chambers. Chamber 34 is located mainly within the interior of cylinder 20 and is defined by the cylinder, the piston 26 and rear head 16. Chamber 36 is likewise located within the interior of cylinder 20 and is defined by the cylinder, piston 26 and front head 14. An annular chamber 38 surrounds cylinder 20 and is defined by the cylinder, wall 18 and the front and rear heads 14 and 16. As shown in FIG. 3, bores 22 communicate chambers 34 and 38. Check valves 24 communicate chambers 36 and 38 and permit one-way flow of hydraulic fluid from chamber 36 to chamber 38. Check valve 40 located in front head 14 also communicates chambers 36 and 38 and permits one-way flow of hydraulic fluid from chamber 38 to chamber 36.

Charge valve 42 is mounted at the bottom of front head 14 in order to permit charging the interior cavities of device 10 with a fluid mixture of hydraulic fluid and pressurized nitrogen gas. With the piston in the extended position of FIG. 3, the interior cavities 34, 36 and 38 are filled with hydraulic fluid up to the level of line 44 with the space above the line filled with pressurized nitrogen gas. The charge pressure of the nitrogen gas may be as high as 600 psi. During cushioning, the piston rod 28 and piston 26 are moved to the left to decrease the total volume of chambers 34 and 36 by the volume of the piston rod 28 moved into cylinder 20 thereby further compressing the nitrogen gas and raising the level of the hydraulic fluid in chamber 38 to a level indicated generally by line 46. The compression of the gas during operation of the cushioning device may increase the pressure of the gas exerted on the hydraulic fluid to as much as about 3,000 psi.

During collapse of the cushioning device and movement of piston 26 toward rear head 16, hydraulic fluid flows outwardly from chamber 34 through bores 22 and past check valve 40 and into chamber 36 to cushion the compression force exerted on the piston rod 28. When the force is released the pressure exerted by the compressed nitrogen gas moves the piston toward front wall 14 and the piston rod 28 is withdrawn from chamber 36 to increase the total volume of chamber 34 and thereby return the device to the position shown in FIG. 3. During extension of the device, hydraulic fluid in chamber 36 flows back to chamber 34 through valves 24, chamber 38 and bores 22. Movement of the piston and rod back and forth in body 12 serves to thoroughly mix and dissolve the gas into the hydraulic fluid to form a homogeneous froth. Accordingly, lines 44 and 46 are indicative of the static levels of the hydraulic fluid when the device has been inactive for a period of time sufficient to allow separation of the gas from the hydraulic fluid.

Cushioning devices 10 are conventionally mounted on railway cars with the end of the piston rod 28 connected to a coupling for joining adjacent railway cars. However, the cushioning device may be used with other applications as previously mentioned.

Pressure indicator 48 is mounted in the lower portion of front head 14 adjacent or contiguous charge valve 42. The indicator includes a body 50 having a hex head 52 facing outwardly of the front head 14 and a cylindrical portion 54 fitted within a bore in the front head and a step 56 joining the head and portion. An enlarged recess 58 is formed in the exterior face of head 52. Threads 60 on portion 54 engage corresponding threads in the front head 14 to secure the indicator in place with an O-ring 62 confined between step 56 and a corresponding step 64 formed in the front head to make a fluid tight seal between the indicator and the front head. Large diameter bore 66 extends from the end of the cylindrical portion 54 to bottom 70 located within head 52. A small diameter pin bore 72 extends from the bottom 70 into recess 58.

Figure 4:
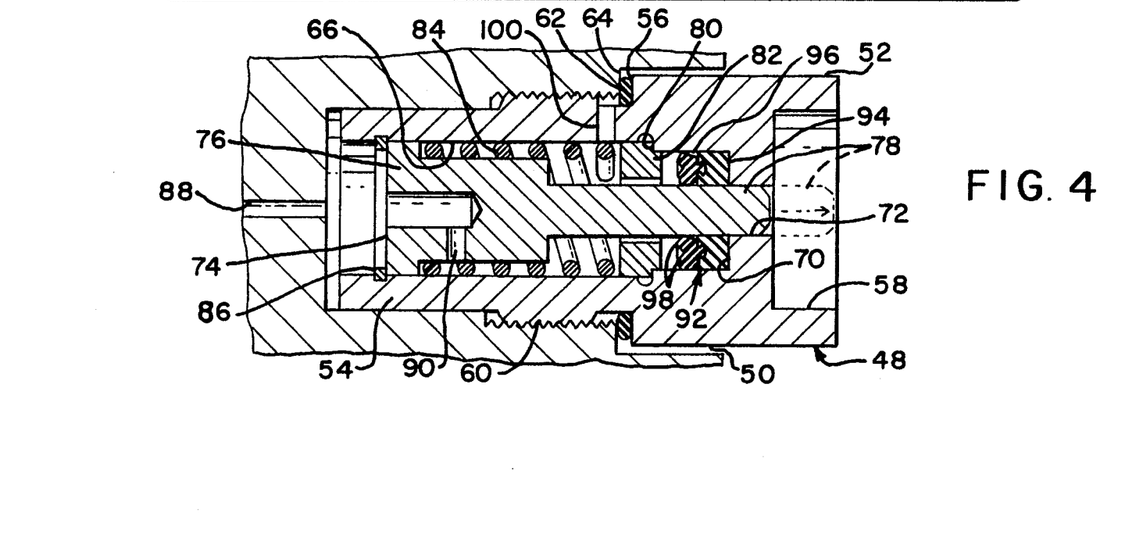

Slide or piston 74 is fitted within bores 66 and 72 and includes a head 76 slidably engaging the larger bore 66 and a smaller diameter indicating pin 78 slidably engaging bore 72 such that shifting of the slide to the right from the position shown in FIG. 4 in solid lines to the position shown in dashed lines moves the end of the pin into the recess 58. As seen in FIG. 4, pin 78 extends outward from head 76. The free or outbound end of the pin or piston rod 78 serves as a tactile indicator means whereby an operator, by manually contacting the tactile indicator and pressing inward on the tactile indicator, can ascertain or sense whether suitable fluid pressure is available in cushioning device 10.

Step 80 in bore 66 faces away from head 52 and provides a stop for spring retention washer 82. Spring 84 is confined within the bore 66 between washer 82 and a flange on slide 74 to bias the piston or slide 74 to the left as shown in FIG. 4. When the piston or slide is in the full retracted position the spring 84 holds piston head 76 against snap ring 86 mounted in a recess in bore 66. In this position of the piston 74, pin 78, as shown in solid lines in FIG. 4, is withdrawn completely from recess 58 with the end of the pin lying flush with the bottom of the recess.

Passage 88 in the front head 14 communicates the pressure indicator bore 66 with chamber 38 of device 10. The pressure indicator 48 is located below the level of hydraulic fluid in body 12 so that the pressurized fluid flows into the indicator. A passage 90 extends from the rear face of head 76 past the head and opens into bore 66 forward of the head 76. In this way, the pressurized hydraulic fluid within body 12 flows past the head and into the bore 66.

A conventional seal washer 92 is seated in the bottom 70 of bore 66 and includes a rigid annular plastic base 94 and an annular rubber seal ring 96 mounted on the base. The seal ring faces away from the recess 58. The seal ring includes inner and outer annular rubber pressure seals 98 with the inner seal engaging pin 78 and the outer seal engaging the adjacent wall of bore 66. The high pressure hydraulic fluid in bore 66 acts on the seals 98 to maintain reliable high pressure seals with the pin and bore. The pressurized hydraulic fluid in bore 66 also provides a lubricant between the pin and the inner seal 98 to facilitate movement of the pin 78 without degrading the seal 98.

Bleed passage 100 extends through the thickness of the body 50 a short distance inwardly of step 56. Occasionally, a workman will start to unthread the pressure indicator 48 from body 12 prior to relieving the pressure of the hydraulic fluid in the body. During initial unthreading of the indicator, the step 56 is moved outwardly from the adjacent shoulder 64 in the front head thereby opening the seal previously formed by O-ring 62. The seal at the shoulder is opened before the pressure indicator 48 is substantially unthreaded from the front head. When the seal is opened, pressure fluid from the interior of the body flows through passages 88, 90 and 100 and out the opening between the indicator and the front head. This initial limited flow of pressurized hydraulic fluid serves as a warning to the worker that the interior of the cushioning device is highly pressurized and alerts the worker to rethread the pressure indicator back into the head to prevent further leakage and possible injury. The flow warns the worker that proper disassembly of the cushioning device requires removal of the pressurized hydraulic fluid and gas from the device using a standard depressurizing procedure through the port normally closed by charge valve 42.

The metal parts of pressure indicator 48 are preferably made from stainless steel in order to prevent corrosion and to assure reliable long-term operation of the indicator.

During normal operation of hydraulic-pneumatic cushioning device 10 the interior pressure of the hydraulic fluid within the device is sufficient to move the slide 74 to the dashed line position shown in FIG. 4 against the force of spring 84, thereby extending the lead end of indicating pin 78 into the interior of recess 58. The seal washer 92 has a high friction engagement with the indicating pin thereby maintaining the pin in the extended position despite the slight variations in pressure of the hydraulic fluid. In this position, the spring is collapsed and the slide piston is bottomed on retention washer 82 and cannot move further to the right.

Hydraulic-pneumatic cushioning devices 10 are highly reliable. For instance, when used as cushioning devices mounted on railway cars for absorbing shocks during coupling of cars, the devices may have useful lives of ten years or longer and may not require any maintenance during their useful life. This reliability is desirable because the cushioning devices are mounted within the railway cars and are relatively inaccessible. The rod seals are highly reliable and effectively maintain the hydraulic fluid within the devices without leakage. These units run dry and maintain the confined nitrogen gas at the original high charging pressure.

Occasionally hydraulic fluid leaks through seals 32 to wet the underside of the device and attract a build-up of dirt and, on occasion, form corrosion on surrounding parts. Minimal leakage of hydraulic fluid from the cushioning device does not affect the ability of the device to cushion shocks between railway cars. Of course, if sufficient hydraulic fluid leaks from a cushioning device the cushioning ability of the device is degraded with the result that the unit is no longer capable of efficiently absorbing coupling shocks. In this case, automobiles or other cargo mounted on the two railway cars being coupled through the cushioning device may be subjected to undesirably high and potentially damaging undamped inertial shocks.

The pressure indicator 48 provides a reliable tactile indicator of the coupling efficiency of the cushioning device 10. The coupling efficiency can be determined by the position of the indicator pin 78 in recess 58. There is no need to observe the position of the pin or to determine whether the cushioning device is wet or dry.

An inspector determines the operating condition of the cushioning device by feeling the exposed end of the pressure indicator 48 to determine whether the indicating pin 78 extends into the recess 58 or is withdrawn. If the pin is withdrawn, the inspector immediately knows that the pressure within the unit is below an acceptable level and the device will not function properly to cushion coupling shocks.

If the pin extends into the recess, the inspector manually pushes the pin in an attempt to move the pin into the body 50. If the pin is hard to push in and, when released, returns to the extended position or shortly after being released returns, the interior of the unit is known to be under high pressure with sufficient hydraulic fluid to assure proper operation. The return of the pin may be delayed due to the high friction between the pin and the seal washer 92. However, if the pin is pushed in and stays in then there is insufficient pressure within the cushioning device to overcome the pressure of spring 84 and the high friction between the pin and the seal washer. In such case, pressure has been decreased by leakage of sufficient hydraulic fluid from the cushioning device to increase the space occupied by the nitrogen gas and decrease the pressure of the nitrogen gas. In this condition, with the low pressure insufficient to return the pin to the extended position, there is insufficient hydraulic fluid within the cushioning device to assure proper cushioning operation. The cushioning device needs to be removed and reconditioned to restore operating efficiency.

Finally, the inspector may find upon initial inspection, that pin 78 is withdrawn from recess 58. This is an indication of insufficient interior pressure and insufficient hydraulic fluid, requiring removal and reconditioning of the cushioning device.

While the present invention has been described in connection with a hydraulic-pneumatic cushioning device as used to couple railway cars, it is clear that the device 10 may also be used for other applications including shock absorber applications for road and off-road vehicles, shock absorbers for presses and other types of machine tools and in other applications using hydraulic-pneumatic cushioning devices where it is desirable to readily and easily determine the condition of the device tactilly.

Figure 5:
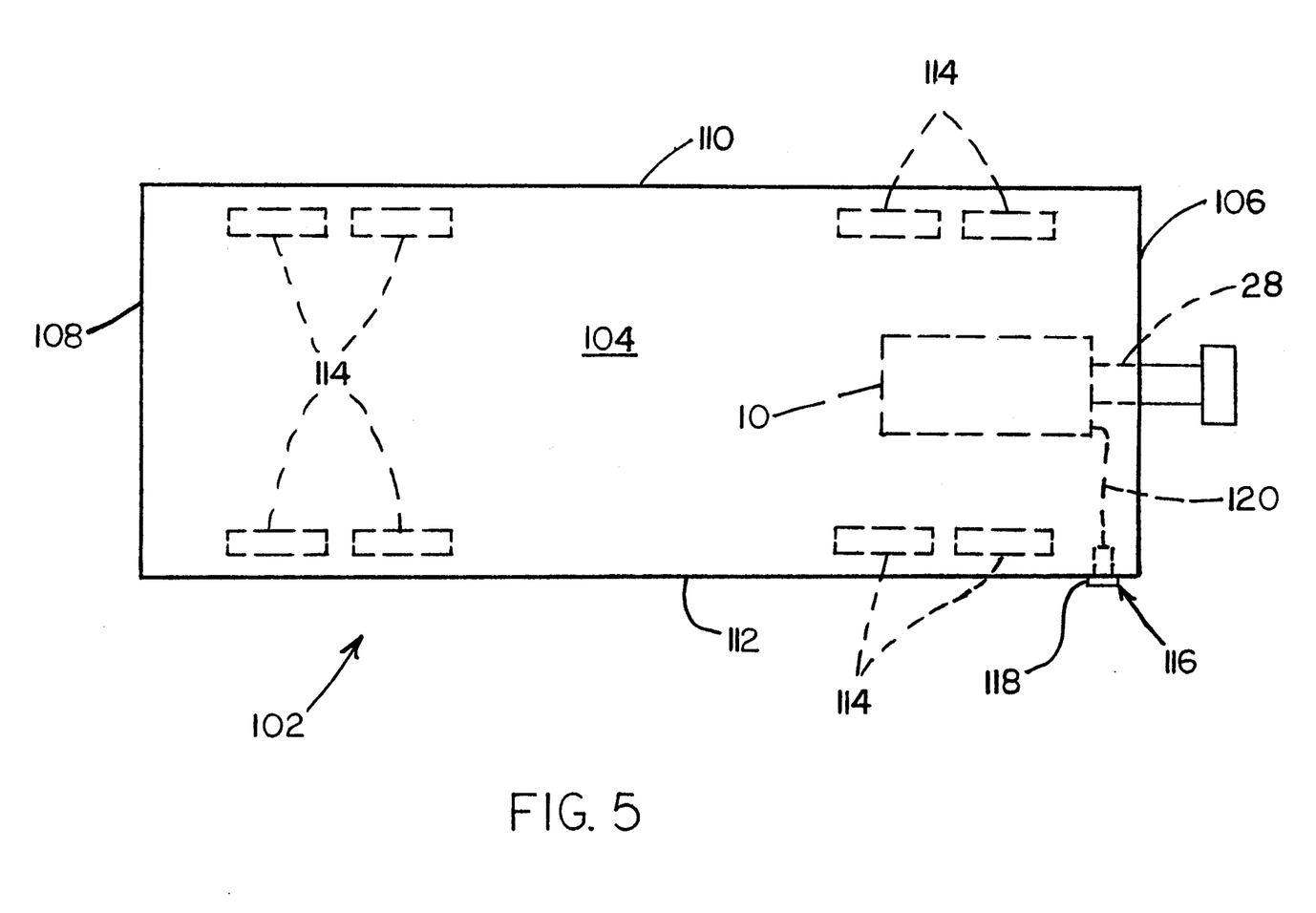
FIG. 5 is a top view of a railway car cushioning device according to the invention.

Pressure indicator 48 is disclosed being mounted directly on the front head 14 of cushioning device 10. FIG. 5 illustrates that device 10 may be mounted on one end of a railway car with the piston rod extending from the car for coupling with another railway car. Alternatively, the pressure indicator may be mounted to a remote location, such as an accessible location on the side or end of a railway car and connected to the cushioning device by an appropriate hydraulic line. FIG. 5 illustrates cushioning unit 10 mounted on one end of railway car 102 below the railway car support surface 104 with piston rod 28 extending beyond car end 106 for coupling with another railway car. As illustrated, the railway car 102 includes a car end 108 located opposite from car end 106 and opposed sides 110 and 112. The car is supported by conventional wheels 114 and wheel assemblies (not illustrated). Pressure indicator 116, identical to pressure indicator 48 as previously described, is mounted on car side 112 with head 118, like head 52, in an accessible location. The indicator may be mounted on car end 106, if desired. Hydraulic line 120 connects indicator 116 to the pressurized reservoir within unit 10. In this way, the pressure of the hydraulic fluid-gas mixture within the reservoir is directly communicated to the interior of the pressure indicator 116 through the line 120 to permit use of the remote indicator 116 in exactly the same way as previously described. The advantage of a remote location of the indicator is that the pressure in the cushioning device can be easily checked without the necessity of reaching under the railway car, locating the cushioning device and the pressure indicator mounted directly on the device and then tactilly sensing the pressure within the device. With a pressure indicator mounted in an accessible remote location, this operation is easily and rapidly performed.

A plastic cover (not illustrated) may be mounted on the exposed end of head 52 to cover the recess and pin and prevent an accumulation of dirt within the recess. The cover is easily removed during determination of the pressure within the cushioning device and then replaced after the test has been conducted.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What is claimed is:

1. A hydraulic-pneumatic cushioning device for cushioning railway cars, said device comprising a body, a piston guide within the body, a piston fitted in the guide, a piston rod connected to the piston and extending outwardly of the body, a fluid reservoir within the body, a fluid in the reservoir including hydraulic fluid and pressurized gas, and a pressure indicator connected to said body and located in communication with fluid in the reservoir, said pressure indicator including pressure sensing means for sensing the pressure of the fluid in the reservoir; movable tactile indicator means for indicating, by touch of the tactile indicator means, the pressure of the fluid in the reservoir, said tactile indicator means being exposed on the outside of the body, connected to the pressure sensing means and adapted to be moved outwardly of the body to an extended position;

said pressure sensing means including piston means disposed within said pressure indicator for moving tactile indicator means from a retracted position inside said pressure indicator to an extended position outside said pressure indicator;

biasing means disposed entirely within said pressure indicator for urging said piston means and tactile indicator means to move the tactile indicator means from the extended position toward the retracted position;

seal means for precluding fluid from exiting said pressure indicator, said seal means being disposed about said piston means and positioned between said biasing means and said tactile indicator means; and means for communicating hydraulic fluid from said reservoir to said pressure sensing means and said seal means in said pressure indicator.

2. A device as in claim 1 wherein the pressure indicator includes a head, a bore extending into an exterior surface on the head, and said tactile indicator means comprises a pin slidably fitted within the bore and having a free end located adjacent the exterior surface on the head, said free end being located outwardly of the exterior surface on the head when in the extended position and being located essentially flush with the exterior surface on the head when in the retracted position.

3. A device as in claim 2 including a recess formed in the surface of the head, said bore being located within the recess.

4. A device as in claim 2 wherein the pin is directly connected to the piston means.

5. A device as in claim 2 wherein said seal means is mounted in the head, the seal means surrounding the pin and the bore, and said device including a passage communicating the reservoir and the seal means.

6. A device as in claim 5 wherein the seal means is located below the level of hydraulic fluid within the reservoir.

7. A device as in claim 6 wherein the seal means includes a circumferential pressure seal surrounding the pin.

8. A device as in claim 7 wherein the seal means includes an annular base facing the recess and an annular flexible seal ring mounted on the base and facing away from the recess.

9. A device as in claim 6 including a threaded connection joining the pressure indicator to the cushioning device body, a circumferential step surrounding the exterior of the pressure indicator and facing the cushioning device body, and a circumferential seal member extending around the outside of the pressure indicator and engaging the step and the cushioning device body at the step to form a pressure seal between the pressure indicator and the cushioning device.

10. A device as in claim 9 wherein the step is located between the threaded connection and said head.

11. A device as in claim 4 wherein said piston means comprises a piston and said biasing means comprises a helical spring surrounding at least a portion of the piston.

12. A device as in claim 11 including a spring retention washer mounted in said head further away from said recess than said seal means, said pin extending through the spring retention means and including a head on the piston away from the pin, said spring being confined between the spring retention means and said head on the piston.

13. A device as in claim 2 wherein said head is directly mounted on the cushioning device body.

14. A device as in claim 2 wherein said head is located remotely from the cushioning device body and including a hydraulic line having ends joined to the head and the body and forming a fluid connection between the fluid reservoir within the body and the head.

15. A device as in claim 3 including a removable cap mounted on said head overlying the recess and pin.

16. The combination of a railway car having a load supporting surface and opposed sides and ends, and a hydraulic-pneumatic cushioning device as in claim 4 secured to one end of the railway car with the piston rod extending outwardly of the car for coupling with another railway car.

17. The combination of claim 16 wherein the pressure indicator is mounted directly on the body of the cushioning device.

18. The combination of claim 16 wherein the exposed tactile indicator means is located on the side or end of the railway car.

19. The combination of claim 18 wherein the pressure sensing means is located adjacent the exposed tactile indicator means and including a pressure line joining the reservoir within the cushioning device body and the pressure sensing means.

20. A device as in claim 1 wherein said piston means includes a piston and a piston passage for receipt of fluid communicated from said reservoir.

21. A device as in claim 20 wherein said cushioning device includes a fluid passage for communicating fluid from said reservoir to said piston passage.

22. A pressure indicator for a hydraulic-pneumatic cushioning device having hydraulic fluid under pressure therein, said indicator comprising an elongated generally cylindrical body defining an open ended interior passage extending along the length of the body, a slide member fitted within the interior passage and movable back and forth along the passage to extend an end of the slide member outwardly of one end of the passage and retract the end back into the passage, a seal fitted within the passage adjacent the one end thereof, the seal surrounding the slide member for preventing hydraulic fluid from flowing out the one end of the passage, a spring disposed entirely within said passage and biasing the slide member away from the one end of the passage, and fastening means disposed on the exterior of the body, the slide member including a piston disposed within the passage and located at the other end of the passage, and a pin at said one end of the passage, said pin being smaller in diameter than said piston and extending through the seal; passage means for permitting hydraulic fluid under pressure from a cushioning device to travel to said one end of said passage and communicate with and lubricate said seal and pin; and retaining means located in said passage between said second opening and said slide member for limiting the travel of said slide member toward said second passage opening.

23. A pressure indicator as in claim 22 including a recess in the exterior surface of the body at said one end of the passage whereby movement of the slide member in the passage moves the end of the pin between a position within the recess and a position flush with the surface of the bottom at the recess.

24. A pressure indicator as in claim 22 wherein said spring is positioned within the passage and surrounds the slide member.

25. A pressure indicator as in claim 22 including a fluid path communicating the other end of the passage with the seal.

26. A pressure indicator as in claim 22 including a snap ring fitted within the other end of the passage wherein the spring biases the slide member against the snap ring.

27. A pressure indicator as in claim 22 including circumferential threads formed on the exterior of the body and a bleed passage formed through the wall of the cylindrical body between the threads and the seal.

28. A pressure indicator in accordance with claim 22 wherein said fastening means includes threads formed on the exterior of said pressure indicator body.

29. A pressure indicator in accordance with claim 22 wherein said piston includes a piston passage for the receipt of fluid located in a cushioning device reservoir.

30. The method of determining the fluid pressure in a hydraulic-pneumatic cushioning device which comprises a body, a piston guide within the body, a piston fitted in the guide, a piston rod connected to the piston and extending outwardly of the body, a fluid reservoir within the body, a fluid in the reservoir including hydraulic fluid and pressurized gas, and a pressure indicator connected to said body and located below at least a portion of the reservoir, said pressure indicator including a body, pressure sensing means disposed within said body for sensing the pressure of the fluid in the reservoir, exposed movable tactile indicator means adapted to extend outside said body, said tactile indicator means connected to the pressure sensing means for indicating, by touch of the tactile indicator means, the pressure generated by fluid in the reservoir; and, said pressure indicator including a piston rod means connected to said pressure sensing means and disposed within said indicator for actuating said movable tactile indicator to move said indicator to a position outside of said indicator;

seal means for precluding fluid from exiting said pressure indicator device, said seal means being disposed about said piston rod and positioned between said pressure sensing means and said tactile indicator means; and, means for communicating fluid from said reservoir within said body to said seal means in said pressure indicator;

said method comprising the steps of:

a) moving the position of said exposed tactile indicator means located outside the device in response to the fluid pressure within the reservoir;

b) tactilly feeling the tactile indicator means to sense the position of the indicator means to determine the pressure in the reservoir;

c) communicating fluid from said cushioning device reservoir to said pressure indicator (i) to act upon said pressure sensing means to cause said tactile indicator to move to said position outside said indicator; and (ii) to contact said seal means in said pressure indicator; and d) sealing said fluid from exiting said pressure indicator at the location of said tactile means while lubricating said piston rod at the location of said tactile indicator means.

31. The method of claim 30 including the steps of moving the indicator means outwardly of a surface to indicate high pressure within the reservoir, and moving the indicator means inwardly toward the surface to indicate low pressure within the reservoir.

32. The method of claim 31 wherein said surface is located in the bottom of a recess and including the step of moving the indicator to the edge of the recess to indicate high pressure within the reservoir.

33. The method of claim 32 including the step of pushing the indicator means from the position outwardly of the surface of the indicator body toward said surface, releasing the indicator means, and pressure-returning the indicator means to the high pressure position when the pressure of the fluid in a reservoir means is greater than a minimum operating pressure.

34. A pressure indicator for use with a cushioning device having fluid under pressure therein, said indicator being adapted to provide a tactile indication of the fluid pressure in the cushioning device, said indicator comprising:

an elongated cylindrical body having an internal passage extending along the length of said body and a first opening located at one end of said passage and a second opening located at another end of said passage;

a movable slide member having a first end and a second end, said slide member being disposed within and movable along the length of said passage;

said first end of said slide member being adapted to extend through and beyond said first opening;

said second end of said slide member being disposed entirely within said passage and normally positioned contiguous to said second opening to be contacted by fluid from said cushioning device, said fluid pressure being adapted to urge a portion of said slide member through said first opening;

biasing means disposed entirely within said indicator and contacting said slide member for urging said slide member toward said second opening;

fluid seal means in said passage and surrounding said slide member for sealing fluid from exiting said first opening, said seal means being disposed contiguous to said first opening between said biasing means and said first opening;

means for retaining said slide member and said biasing means from exiting said second opening, said retaining means being located in said passage between said second opening and said slide member; and, passage means for permitting fluid under pressure to travel from said second opening and communicate with said seal means.

35. A pressure indicator in accordance with claim 34 and further including fastening means disposed externally on said body for fastening said indicator to a cushioning device.

36. A pressure indicator in accordance with claim 35 wherein said fastening means comprises threads on an exterior surface of said body.

37. A pressure indicator in accordance with claim 34 wherein said body has a recess in said exterior surface adjacent said first opening whereby said slide member is adapted to project into said recess.

38. A pressure indicator in accordance with claim 34 wherein said passage means extends between said body and said slide member for allowing fluid from a cushioning device to enter said passage at said second opening and travel along the passage to said seal means.

39. A pressure indicator in accordance with claim 38 wherein said slide member includes a piston portion located at said second end.

40. A pressure indicator in accordance with claim 39 wherein said first end of said slide member includes a pin extending out from said piston portion and having a free end which is adapted to extend out of said first opening.

41. A pressure indicator in accordance with claim 38 wherein said passage means includes a fluid passage which extends through at least a portion of said slide member.

42. A pressure indicator in accordance with claim 37 wherein said retaining means comprises a snap ring disposed in said body contiguous to said second opening.

43. A pressure indicator in accordance with claim 42 wherein said snap ring is engageable with said slide member.

44. A pressure indicator device in accordance with claim 34 wherein said body includes a first abutment means disposed along the length of said passage for limiting the travel of said biasing means along the length of said passage.

45. A pressure indicator in accordance with claim 44 wherein said first abutment means is annular shaped.

46. A pressure indicator in accordance with claim 45 and further including a spring retention means seated against said first abutment means and contacting said biasing means.

47. A pressure indicator in accordance with claim 46 and further including a retainer means disposed within said passage, surrounding said slide member and engageable with said first abutment means and said biasing means for maintaining said biasing means in position in said passage.

48. A pressure indicator in accordance with claim 44 wherein said seal means is positioned between said first abutment means and said first opening.

49. A pressure indicator in accordance with claim 44 wherein said biasing means comprises a helical spring.

50. A pressure indicator in accordance with claim 47 and further including a second abutment means disposed along the length of said passage and spaced from said first abutment means for serving as an abutment for said seal means.

51. A pressure indicator in accordance with claim 34 wherein said seal means is fluid pressure activated.

52. A pressure indicator for a hydraulic-pneumatic cushioning device used in railway cars and having fluid under pressure located in a reservoir in said cushioning device, said pressure indicator comprising an elongated generally cylindrical body defining an open ended interior passage extending along the length of the indicator body; a first opening at one end of the passage and a second opening at the other end of the passage, a slide member having two ends fitted entirely within the interior passage, the slide member being movable back and forth along the passage and adapted to have one end of the slide member extend outwardly of the first passage opening and retract back into the passage; seal means fitted within the passage contiguous to the first passage opening, the seal means surrounding the slide member for preventing fluid from flowing out the passage, a spring disposed entirely within the indicator body for biasing the slide member away from the first passage opening; retention means located at the opposite end of the slide member for retaining the slide member within the indicator, said retention means being located between said second opening and said slide member; fastening means located on the exterior of the indicator body for fastening said indicator to a cushioning device; said slide member including a piston and a pin including tactile indicator means located at the free end of the pin, said pin extending through the seal means; said seal means being positioned between said spring and said first opening in said passage; and passage means for permitting fluid under pressure to travel from said second opening and communicate with said seal means located contiguous to said first opening.

53. A pressure indicator in accordance with claim 52 wherein a portion of the exterior of said elongate body is hexagonally shaped for receipt of a fastening tool.

54. A pressure indicator in accordance with claim 53 wherein said fastening means comprises threads located on the exterior surface of said body.

55. A pressure indicator in accordance with claim 34 or 52 in combination with a cushioning device which comprises a body, a chamber within said body, a piston within said chamber, a piston rod connected to said piston, said rod extending outside of said body, a fluid reservoir within said body and fluid under pressure disposed within said reservoir, and means connecting said fluid reservoir with said pressure indicator for permitting fluid from said reservoir in said cushioning device to enter said pressure indicator and contact said slide member for urging said one end of said slide member through said first passage opening.

56. A pressure indicator in accordance with claims 22, 34 or 52 including threads formed on the exterior of said pressure indicator body, a circumferential step extending around the exterior of said body, and circumferential seal means extending around said body between the threads and the step for forming a seal between the pressure indicator and a cushioning device.

* * * * *